United States Patent [19]

Mansour

[11] Patent Number: 6,035,278
[45] Date of Patent: Mar. 7, 2000

[54] METHOD AND SYSTEM FOR SCHEDULE AND TASK MANAGEMENT

[75] Inventor: Steven F. Mansour, Milpitas, Calif.

[73] Assignee: Netscape Communications Corporation, Mountain View, Calif.

[21] Appl. No.: 08/889,660

[22] Filed: Jul. 8, 1997

[51] Int. Cl.[7] .................................................. G06F 15/21
[52] U.S. Cl. .......................... 705/9; 705/5; 705/6; 705/8; 705/9
[58] Field of Search .................... 705/8, 9, 5, 6; 707/10

[56] References Cited

U.S. PATENT DOCUMENTS

| | | | |
|---|---|---|---|
| 4,751,635 | 6/1988 | Kret ............................................ | 707/10 |
| 4,937,743 | 6/1990 | Rassman et al. ............................ | 705/8 |
| 5,050,077 | 9/1991 | Vincent ....................................... | 705/8 |
| 5,124,912 | 6/1992 | Hotaling et al. ............................ | 705/9 |
| 5,197,000 | 3/1993 | Vincent ....................................... | 705/8 |
| 5,212,793 | 5/1993 | Donica et al. ........................... | 709/105 |
| 5,270,920 | 12/1993 | Pearse et al. ................................ | 705/8 |
| 5,319,781 | 6/1994 | Syswerda .................................... | 705/8 |
| 5,406,476 | 4/1995 | Deziel, Jr. et al. ......................... | 705/8 |
| 5,440,681 | 8/1995 | Kudo .......................................... | 705/8 |
| 5,524,077 | 6/1996 | Faaland et al. ............................. | 705/8 |
| 5,596,502 | 1/1997 | Koski et al. .............................. | 700/95 |
| 5,606,695 | 2/1997 | Dworzecki .................................. | 705/8 |
| 5,737,728 | 4/1998 | Sisley et al. ................................ | 705/8 |

OTHER PUBLICATIONS

Al–Mouhamed, "Lower bound on the number of processors and time for scheduling precedence graphs with communication costs", IEEE Trans. on software engineering, vol. 16, No. 12, pp. 1390–1401, Dec. 1990.

Schwan et al., "Dynamic scheduling of hard real–time tasks and real–time threads", IEEE Trans. on software engineering, vol. 18, No. 8, pp. 736–748, Aug. 1992.

Yuan et al., "A decomposition approach to non–preemptive scheduling in hard real–time systems", IEEE, pp. 240–248, 1989.

Panwalkar et al., "A survey of scheduling rules", Operations Research, vol.25, No. 1, pp. 45–60, Jan. 1977.

Zhao et al., "Simple and integrated heuristic algorithms for scheduling tasks with time and resource constraints", Journal of systems & software, vol. 7, Iss:3, pp. 195–205, 1987.

(List continued on next page.)

*Primary Examiner*—James P. Trammell
*Assistant Examiner*—Cuong H. Nguyen
*Attorney, Agent, or Firm*—Michael A. Glenn

[57] ABSTRACT

A method and system are provided for scheduling and time management. The invention is adapted for use with computer systems, including intranet and Internet systems. The schedule owner schedule tasks and appointments with a scheduling tool. A threshold amount indicating the total amount of meetings or other interruptions the schedule owner prefers during a time period is selected. This threshold amount is defined according to number, time, type, or scheduler. A scheduler accesses the schedule with the scheduling tool to search for un-scheduled times in which to set a meeting. If such meeting exceeds the threshold amount, a signal is given by the scheduling tool. Alternative embodiments permit or prohibit the scheduling of a meeting in excess of said threshold. The invention is also operable as a group scheduling application. The schedules of any number of prospective attendees are compared to locate a time at which all of said users are available. A meeting may then be scheduled at that time. The scheduling tool signals the scheduler if the meeting exceeds the threshold amount of any of the prospective attendees. The invention permits the schedule owner to manage the amount of time required to complete a task. The schedule owner selects the amount of time required to perform the task. The scheduling tool displays an indicator showing a remaining amount of the selected time. Additionally, the scheduling tool may be configured to automatically connect the scheduler to one of an email, voice mail, or computer messaging.

21 Claims, 2 Drawing Sheets

OTHER PUBLICATIONS

Saksena et al., "Temporal analysis for hard real–time scheduling", IEEE 1993, pp. 538–544.

Noller, D., "Program gives best choices for scheduling meetings", Industrial Engineering, vol.16, No.1, Jan. 1984.

Fersko–Weiss, "Super project expert", PC Magazine; vol.9, No. 15, p.358(2), Sep. 1990.

Zhao et al., "Scheduling tasks with resource requirements in hard real–time systems", IEEE Trans. on software engineering, vol. SE–31, No.5, New York, pp. 564–576, May 1987.

Sprunt et al., "Aperiodic task scheduling for hard real–time systems", Proc. of the IEEE, vol.82, No.1, New York, pp. 55–67, Jan. 1994.

Lorts et al., "Empirical evaluation of weighted and prioritized static scheduling heuristics for real–time multi–processing", IEEE 1994, pp. 58–72.

METHOD AND SYSTEM FOR SCHEDULE AND TASK MANAGEMENT

BACKGROUND OF THE INVENTION

1. Technical Field

The invention relates to office management. More particularly, the invention relates to a method and system for managing a meeting schedule.

2. Description of the Prior Art

Individual and group scheduling applications are known in the prior art. Such scheduling applications display a person's schedule, indicating free and busy times. The schedules of several people may be compared and the common free times displayed. A meeting may therefore be scheduled at a time when all persons can attend.

The prior art scheduling applications do not take into account other tasks which must be performed by the prospective attendees. For example, an employee requires sufficient time during the week to complete work assignments. However, a person scheduling meetings is frequently not aware of the level of intrusion of such meetings on the schedule owner.

Two problems occur when the time devoted to a task is interrupted. The first problem is that the lost time must be made up to keep the task completion on schedule. This lost time is frequently made up after regular working hours or on weekends. The second problem encountered is attributed to context switching.

Estimates for the amount of time to complete an assignment are typically based on uninterrupted time. Thus, an estimated one hour assignment may be completed in one uninterrupted hour, but not in four separate 15 minute sessions. This is because time is required to become re-oriented to the task, and to begin again. The more interruptions, the greater the deleterious effect on completing the task.

However, the prior art group scheduling packages allow the employee to be scheduled for meetings at any time that has not already been booked for a meeting. In fact, the employee may be double-scheduled for meetings. Much or all of the employee's time may therefore be scheduled, thereby significantly restricting the time available to perform tasks. Therefore, the employee must make up the lost time, despite having scheduled in advance sufficient time to complete the task.

The need has therefore arisen for a scheduling package that gives the schedule owner some control over the amount of interruptions that can be scheduled. The need has also arisen for tracking the amount of time that the schedule owner has to recoup as a result of such interruptions.

It would be an advantage to provide a system and method for scheduling and time management that notifies the scheduler of an infringement on a prospective attendee's time. It would be a further advantage if such system and method permitted group scheduling of meetings. It would be yet another advantage if such method and system permitted a user to dynamically allocate available time for meetings.

SUMMARY OF THE INVENTION

The invention provides a method and system for scheduling and time management. The preferred embodiment of the invention is used with computer systems, including Intranet and Internet systems. The schedule owner uses a scheduling tool to schedule tasks and appointments during a period of time. The schedule owner also selects a threshold amount of meetings in this time period. This threshold amount of meetings is the total amount of meetings or other interruptions that the schedule owner prefers during the period.

In the preferred embodiment of the invention, this threshold amount may be defined by any of the number of meetings, time per meeting, or total time of all meetings. The threshold amount may further be defined by the type of meeting, or according to the person scheduling the meeting. Thus, the threshold amount of meetings with an employer may be scheduled to exceed the amount of meetings with a sales representatives.

A scheduler accesses the schedule owner's schedule using the scheduling tool. The scheduler may then search the schedule owner's schedule to locate un-scheduled or free times. The scheduler uses the scheduling tool to schedule meetings with the schedule owner. If such meeting exceeds the threshold amount selected by the schedule owner, a signal is given by the scheduling tool. This signal is any of a text, graphical display, visual display, sound, animation, video display, or voice message.

In the preferred embodiment of the invention, the scheduling tool permits the scheduling of a meeting in excess of said threshold. However, in an alternative embodiment, scheduling a meeting in excess of said threshold is prohibited.

The scheduler may access the scheduling tool and schedule owner's schedule on a networked computer. Alternatively, the scheduler may also use the schedule owner's computer. For example, an administrative assistant may access an employer's computer to schedule or confirm meetings using the invention.

The invention is also operable as a group scheduling application. The scheduling tool may access the schedules of any number of prospective attendees. These schedules are compared to locate a time at which all of said users are free. A meeting may then be scheduled in that free time. The scheduling tool signals the scheduler if the meeting exceeds the threshold amount of any of the prospective attendees.

The invention is configurable to permit the scheduler to schedule a meeting if a certain number, but not all prospective attendees are available. Additionally, the invention is configurable to permit the meeting to be scheduled if the threshold amount is reached for fewer than a certain number of prospective attendees.

The invention permits the schedule owner to manage the amount of time required to complete a task. The schedule owner selects the amount of time required to perform the task. The scheduling tool displays an indicator showing a remaining amount of said selected time.

The invention may provide a visual or audio display of the schedule. Additionally, the scheduling tool may be configured to automatically connect the scheduler to one of an email, voice mail, or computer messaging.

DETAILED DESCRIPTION OF THE INVENTION

The invention provides a method and system for scheduling and time management. The preferred embodiment of the invention is used with computer systems, including Intranet and Internet systems. However, the invention may also be used with other devices, including personal data assistants, and Internet-capable telephones. The invention is readily implemented by one skilled in the art using well-known programming techniques and equipment.

The invention provides a method and system for scheduling and time management. The preferred embodiment of the invention is used with computer systems, including intranet and Internet systems. A schedule owner uses the invention to dynamically allocate a desired amount of meetings in a period of time. The schedule owner also uses the invention to manage the completion of a designated task. A schedule uses the invention to schedule meetings with the schedule owner. The invention notifies the scheduler when the schedule owner has been scheduled for more than the desired number of meetings. The scheduler is thereby made aware whether the prospective meeting may be an undue burden on the schedule owner.

Figure 1:
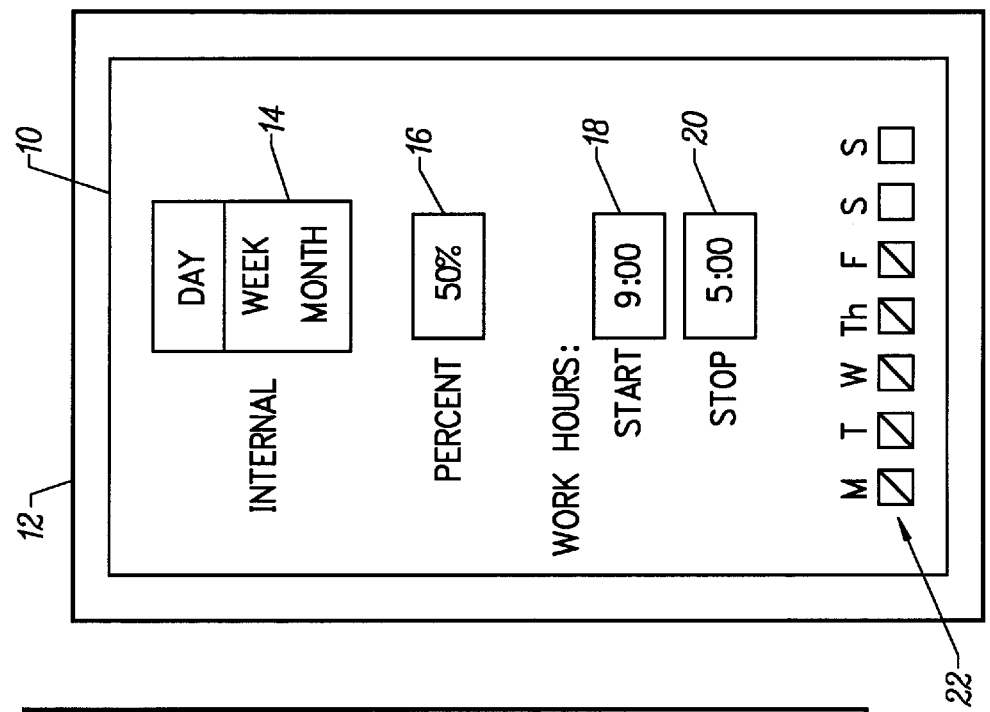
FIG. 1 is a view of a setting dialog according to the invention.

The schedule owner uses a scheduling tool to schedule tasks and appointments during a period of time. FIG. 1 is a view of a setting dialog 10 according to the invention. The scheduling tool is interactively displayed, for example, on the display screen 12 of the schedule owner's computer. The schedule owner inputs information to the scheduling tool by any of such device as keyboard entry, menu selection, and touch screen selection. For example, the setting dialog may include input boxes that permit the schedule owner to select the interval 14 for the schedule. Starting and stopping work hours 18, 20 and work days 22 may also be designated.

The schedule owner also uses the scheduling tool to select a threshold amount of meetings in this time period. This threshold amount of meetings is the total amount of meetings or other interruptions that the schedule owner prefers during the period. The threshold amount may vary, for example, according to the job, responsibilities, and particular work load of the schedule owner.

In the preferred embodiment of the invention, this threshold amount is defined by the percentage of time 16 allocated to meetings. In alternative embodiments, the threshold amount is defined by number of meetings, time per meeting, total time of all meetings. As an example, the schedule owner can designate thresholds of 4 meetings, two hours maximum per meeting, or 8 hours total meeting time per week. The threshold amount may further be defined by the type of meeting, or according to the person scheduling the meeting. Thus, the threshold amount of meetings with an employer may be scheduled to exceed that for meetings with sales representatives.

The scheduling tool is also used by a scheduler to access the owner's schedule. The schedule may be, for example, an employer, or any person to whom the schedule owner has given permission to access the schedule. The scheduler uses the scheduling tool to locate unscheduled times in the owner's schedule. Meetings are then preferably set during such unscheduled times.

If the prospective meeting exceeds the threshold amount selected by the schedule owner, a signal is given by the scheduling tool. This signal is one of a text, graphical display, visual display, sound, animation, video display, or voice message. In the preferred embodiment of the invention, the signal is a visual display in the background of the schedule. For example, the background of the block representing the time of the prospective meeting can be shaded a different color, or display text or graphical symbols indicating that threshold has been reached. The invention is also operable as a group scheduling application. The scheduling tool may access the schedules of any number of prospective attendees.

Figure 2:
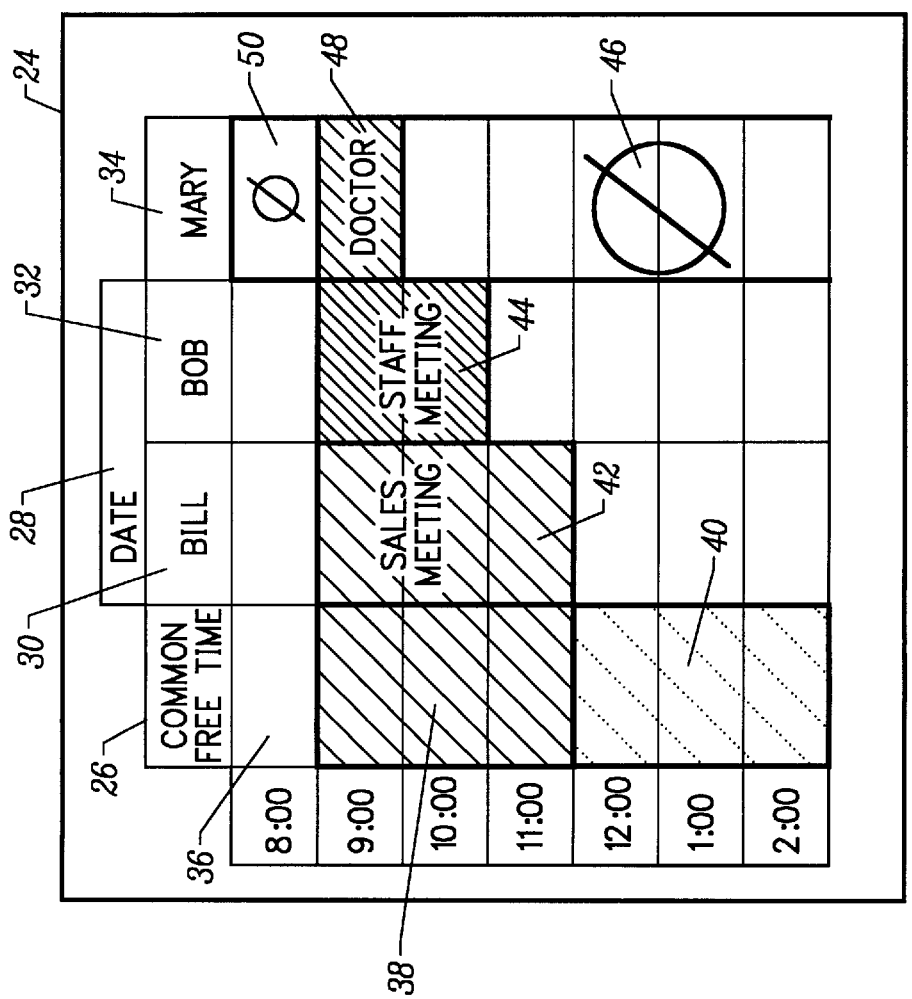
FIG. 2 is a view of a displayed schedule from the scheduling tool according to the invention.

FIG. 2 is a view of a displayed schedule 24 from the scheduling tool, according to the invention. This schedule is displayed, for example, on the display screen of the scheduler's computer (not shown). The display shows employees' schedules 30, 32, 34 for a particular date 28, as well as their common free time 26. In FIG. 2, the schedules are arranged according to time of day. The display configuration shown in FIG. 2 is for exemplary purposes only, and is not intended to be a limitation upon the scope of the invention. It will be readily appreciated by one skilled in the art that the schedule display may be configured differently, according to the requirements of the users.

Each employee's schedule indicates un-scheduled, or "free" times 50 as well as scheduled time. For example, employee Bill 28 has a scheduled sales meeting 42 between the hours of 9:00 and 12:00. Bob 32 has a staff meeting 44 scheduled from 9:00 until 11:00. Mary 34 has a doctor's appointment 48 between 9:00 and 10:00.

These schedules are compared to locate a common time 36 at which all of said users are free. A meeting may then be scheduled in that free time. In the Figure, the only common free time is between 8:00 and 9:00. If the scheduler sets a meeting between the hours of 12:00 and 2:00, the scheduling tool signals the scheduler. This is because Mary has reached her threshold amount of meetings. In the example, this is indicated by a "Stop" symbol 46 in Mary's schedule. The invention may be configured to signal the scheduler when any individual employee, or when all employees have reached their threshold. In the Figure, stippling 40 is used to indicate that the hours between 12:00 and 2:00 common free time, but that at least one invitee has reached their threshold.

Figure 3:
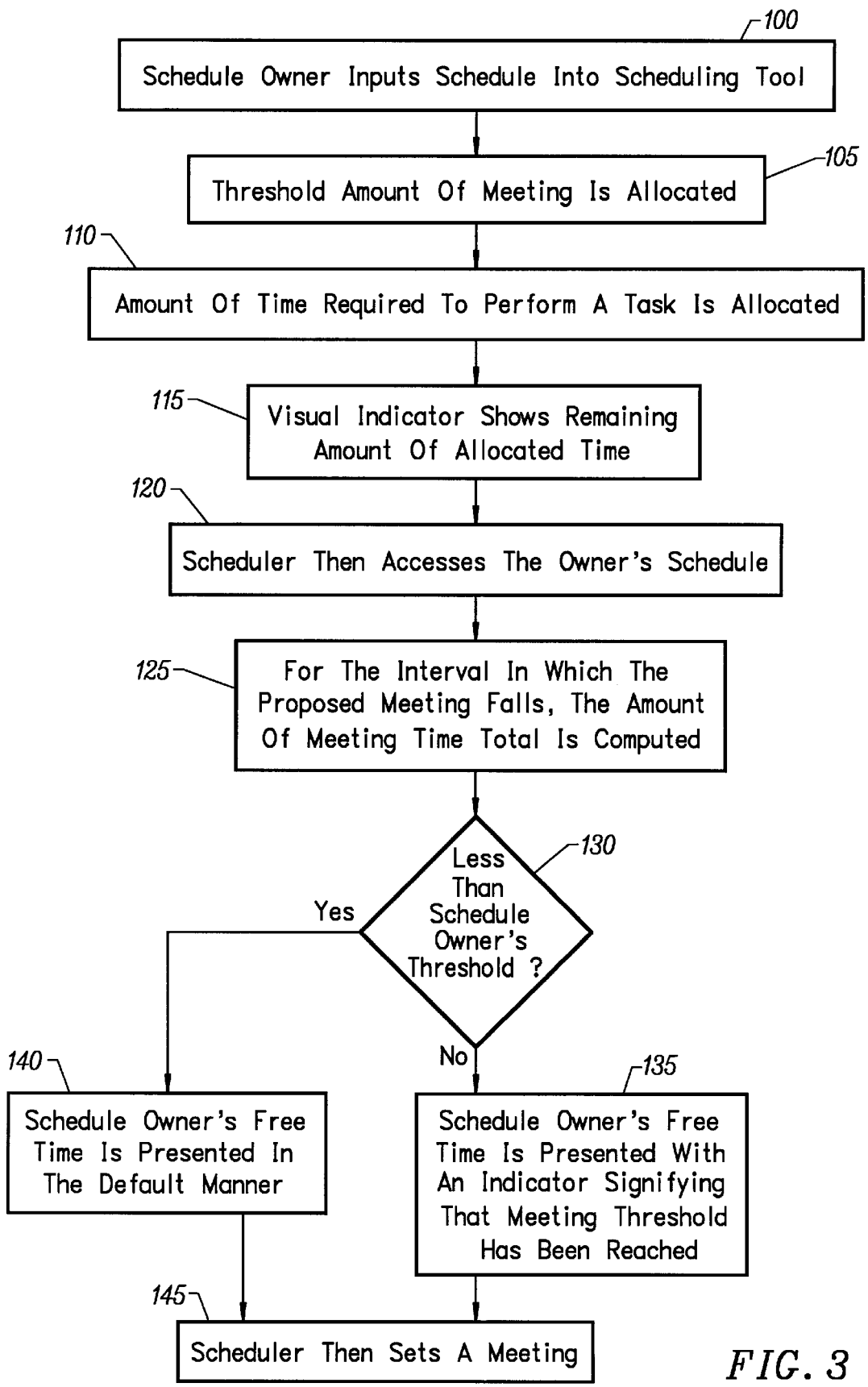
FIG. 3 is a flowchart of the method for scheduling and time management according to the invention.

FIG. 3 is a flowchart of the method for scheduling and time management, according to the invention. The schedule owner first inputs (100) the owner's schedule into the scheduling tool. The threshold amount of meetings is allocated (105). The schedule owner may optionally allocate the amount of time required to perform a task (110). The scheduling tool subsequently displays a visual indicator (115) showing the remaining amount of the allocated time. The scheduler then accesses the owner's schedule (120). The scheduling tool locates free time (125) and displays it, taking the threshold into account. If less than the schedule owner's threshold has been scheduled (130), the schedule owner's free time is scheduled in a default manner (140). The scheduler then sets a meeting (145). If the schedule owner's free time threshold has been exceeded (130), the schedule owner's free time is presented with an indicator signifying that the meeting threshold has been reached (135). The scheduler may then set a meeting (145), preferably during the free time and, more preferably, when no invitee's threshold has been reached.

The signal may also be configured to indicate a specific status. For example, the color red may be used to indicate that the schedule owner is absolutely not available during a particular time slot. Blue may be used to indicate that the schedule owner is available during that time.

In the preferred embodiment of the invention, the scheduling tool permits the scheduling of a meeting in excess of said threshold. The preferred embodiment also permits more than one meeting to be scheduled at the same time.

However, in an alternative embodiment, scheduling a meeting in excess of said threshold is prohibited. The schedule owner may also be given authority to accept or decline any meeting set by the scheduler.

The scheduler may access the scheduling tool and schedule owner's schedule on a networked computer. As an example, the schedules of all employees may be stored on an intranet server. Employers can then use the invention to monitor employees' work, as well as to schedule meetings. Alternatively, the scheduler may also access the schedule using the schedule owner's computer. For example, an administrative assistant may use the invention to access an employer's computer and schedule or confirm meetings.

The invention is configurable to permit the scheduler to schedule a meeting if a certain number, but not all prospective attendees are available. Additionally, the invention is configurable to permit the meeting to be scheduled if the threshold amount is reached for fewer than a certain number of prospective attendees.

The invention permits the schedule owner to manage the amount of time required to complete a task. The schedule owner selects the amount of time required to perform the task. In the preferred embodiment of the invention, the scheduling tool displays a visual indicator showing a remaining amount of said selected time. In alternative embodiments, this indicator is aural.

The invention may provide a visual or audio display of the schedule. Additionally, the scheduling tool may be configured to automatically connect the scheduler to one of an email, voice mail, or computer messaging.

Although the invention is described herein with reference to the preferred embodiment, one skilled in the art will readily appreciate that other applications may be substituted for those set forth herein without departing from the scope of the present invention.

The scheduling tool may readily be adapted to provide an audio display of said schedule. Thus, when a scheduler accesses a schedule, the schedule is provided as a sound file, for example, projected through the speakers of the scheduler's computer. The invention therefore permits users to leave the computer to perform other tasks while the requested schedule is accessed.

The invention may be interfaced to other software applications or electronic devices. For example, the invention may interface with a fax program. Thus, a fax may be sent at a time designated in the schedule.

The invention may also be interfaced with email, voicemail, or pager devices. As an example, the scheduler may be automatically connected to voicemail when the meeting threshold has been reached. The scheduler may thereby leave a message for the schedule owner explaining the purpose for the meeting.

In an alternative embodiment of the invention, the schedule is configured to restrict the scheduling of meetings according to scheduler. Thus, a manager may be permitted to schedule meetings at all times, while a sales representative may be restricted to scheduling meetings in the morning.

The invention may be configured to automatically identify the scheduler. For example, the invention is readily adapted to accept a password, or to identify a permission attached to the scheduler's computer access account.

The invention may also be provided with an alarm feature. The schedule owner is notified when meetings are scheduled to begin. The schedule owner may also set an alarm for notification if a certain number of task hours has or has not been completed by a specific time. For example, the alarm will notify the schedule owner that only 10 hours of a 30 hour task have been completed by Wednesday afternoon.

The schedule owner may thereupon cancel all meetings for the rest of the week to permit sufficient time to complete the task.

Standard categories may be provided for use by either schedule owner or scheduler. As an example, categories such as medical appointments, luncheons, and business trips can be assigned designated markers. These markers are then placed in the schedule as appropriate.

In one embodiment of the invention, the scheduling tool accesses the schedule frequently to minimize the effects of contention among schedulers. For example, the scheduling tool may access the schedule every 3 seconds. In such case, a scheduler is quickly notified of any intervening scheduling changes.

Accordingly, the invention should only be limited by the Claims included below.

I claim:

1. A method for scheduling and time management on a computer network, comprising the steps of:

in a scheduling tool, a schedule owner dynamically allocating a threshold amount of meetings in said schedule owner's schedule, wherein said threshold amount of meetings is the total amount of meetings or other interruptions that the schedule owner prefers during a time interval; and a scheduler accessing said schedule owner's schedule with said scheduling tool;

wherein when said scheduler schedules a meeting with said schedule owner, said scheduling tool signals said scheduler if said threshold amount of meetings has been reached or exceeded.

2. The method of claim 1, wherein said signal is at least any one of a text, graphical display, visual display, sound, animation, video display, or voice message.

3. The method of claim 1, further comprising the step of the scheduling tool prohibiting the scheduling of a meeting in excess of said threshold.

4. The method of claim 1, further comprising the step of the scheduling tool permitting the scheduling of a meeting in excess of said threshold if predetermined schedule owner preferences are met by said meeting.

5. The method of claim 1, further comprising the steps of:

said scheduling tool accessing schedules of a plurality of schedule owners; and said scheduling tool comparing said schedules to locate a time at which all of said schedule owners are free;

wherein a meeting may be scheduled in said free time.

6. The method of claim 1, further comprising the step of:

said schedule owner dynamically allocating the amount of time required to perform a task; and the scheduling tool displaying a visual indicator showing a remaining amount of said allocated time.

7. The method of claim 1, further comprising the step of providing at least one of a visual or audio display of said schedule.

8. The method of claim 1, further comprising the step of the scheduling tool automatically connecting said scheduler to at least one of an email, voice mail, or computer messaging application when said threshold has been reached or exceeded.

9. A method for scheduling and time management on a computer network, comprising the steps of:

a schedule owner dynamically allocating a threshold amount of meetings in said schedule owner's schedule, wherein said threshold amount of meetings is the total amount of meetings or other interruptions that the schedule owner prefers during a time interval;

a scheduler accessing schedules of said schedule owner with a scheduling tool; and said scheduling tool comparing said accessed schedules to locate times at which all schedule owners are free;

wherein when said scheduler schedules a meeting during said free time with said schedule owners, said scheduling tool signals said scheduler if a selected threshold amount of meetings has been reached or exceeded.

10. The method of claim 9, wherein said signal is at least one of a text, graphical display, visual display, sound, animation, video display, or voice message.

11. The method of claim 9, further comprising the step of the scheduling tool prohibiting the scheduling of a meeting in excess of said threshold.

12. The method of claim 9, further comprising the step of the scheduling tool permitting the scheduling of a meeting in excess of said threshold.

13. The method of claim 9, further comprising the step of:

said schedule owner dynamically allocating the amount of time required to perform a task; and the scheduling tool displaying a visual indicator showing a remaining amount of said allocated time.

14. The method of claim 9, further comprising the step of providing at least one of a visual or audio display of said schedule.

15. The method of claim 9, further comprising the step of the scheduling tool automatically connecting said scheduler to at least one of an email, voice mail, or computer messaging application when said threshold has been reached or exceeded.

16. A system for scheduling and time management on a computer network, comprising:

a scheduling tool for receiving a schedule owner's schedule, wherein said schedule owner may dynamically allocate a threshold amount of meetings in said schedule owner's schedule, wherein said threshold amount of meetings is the total amount of meetings or other interruptions that the schedule owner prefers during a time interval;

an interface for a scheduler to access said schedule owner's schedule with said scheduling tool; and a signaling module in said scheduling tool for signaling said scheduler if said threshold amount of meetings has been reached or exceeded when said scheduler schedules a meeting with said schedule owner.

17. The system of claim 16, wherein said signalling module signal is at least one of a text, graphical display, visual display, sound, animation, video display, or voice message.

18. The system of claim 16, said scheduling tool further comprising a scheduling module for prohibiting the scheduling of a meeting in excess of said threshold.

19. The system of claim 16, said scheduling tool further comprising a group scheduling module for accessing schedules of a plurality of schedule owners and for comparing said schedules to locate a time at which all of said schedule owners are free, wherein a meeting may be scheduled in said free time.

20. The system of claim 16, further comprising a connecting module for automatically connecting said scheduler to at least one of an email, voice mail, or computer messaging application when said threshold has been reached or exceeded.

21. The system of claim 16, further comprising:

a task module for dynamically allocating the amount of time required to perform an assignment; and a visual indicator for displaying a remaining amount of said allocated time.

* * * * *